United States Patent [19]
Fracke, deceased et al.

[11] 3,819,946

[45] June 25, 1974

[54] APPARATUS FOR MEASURING THE LOCAL NEUTRON DENSITY DISTRIBUTION IN THE INTERIOR OF A NUCLEAR REACTOR

[75] Inventors: Aribert Fracke, deceased, late of Erlangen, Germany by Waltraut Fracke, Legal Representative; Hans Wachtler, Baiersdorf, Germany

[73] Assignee: Siemens Aktiengesellschaft, Munich, Germany

[22] Filed: Aug. 3, 1972

[21] Appl. No.: 277,551

[30] Foreign Application Priority Data
Aug. 5, 1971 Germany............................ 2139152

[52] U.S. Cl.............. 250/374, 250/390, 250/442, 250/453, 250/492
[51] Int. Cl. ............................................... G01t 3/00
[58] Field of Search .......... 250/106 L, 83.1, 835 A, 250/374, 390, 442, 453, 492; 176/26, 19

[56] References Cited
UNITED STATES PATENTS

| | | |
|---|---|---|
| 2,564,626 | 8/1951 | MacMahon et al................ 250/83.1 |
| 2,872,400 | 2/1959 | Bugbee et al......................... 176/26 |
| 3,234,385 | 2/1966 | Campbell............................ 250/83.1 |
| 3,259,745 | 7/1966 | Garlick .............................. 250/83.1 |
| 3,263,081 | 7/1966 | Wiesemann et al. ................. 176/26 |
| 3,681,194 | 8/1972 | Dieck.................................... 176/19 |

*Primary Examiner*—Harold A. Dixon
*Attorney, Agent, or Firm*—Kenyon & Kenyon Reilly Carr & Chapin

[57] ABSTRACT

A system which measures the local neutron density distribution in the fission zone within a nuclear reactor. The measuring system includes a guide tube mounted in and extending through the reactor wall and the fission zone. A probe configured as a helical spring is mounted for motion within the interior of the guide tube and is driven by compressed air between activation and measurement positions located internally and externally of the reactor vessel, respectively. A measuring unit is connected with the guide tube for measuring the level of radioactivity of the probe when it is in its measurement position.

8 Claims, 2 Drawing Figures

APPARATUS FOR MEASURING THE LOCAL NEUTRON DENSITY DISTRIBUTION IN THE INTERIOR OF A NUCLEAR REACTOR

BACKGROUND OF THE INVENTION

This invention relates to a system for measuring the local neutron density distribution in the interior of a nuclear reactor. In particular it relates to a measuring system utilizing a guide tube extending through the reactor vessel for guiding the motion of a probe between positions inside and outside the reactor wherein the level of radioactivity of the probe is measured after it has travelled through the reactor.

One prior system for measuring the neutron density distribution in the interior of a nuclear reactor, utilizes a guide tube extending from the reactor and its internal core or fission zone to an external location. Compressed air is utilized to move a probe along the guide tube between positions within the fission zone and an external location where the distribution of radioactivity along the length of the probe is measured thereby providing an indication of the corresponding local neutron density distribution within the reactor. The measuring probe may be rod-shaped, tape-shaped or wire-shaped and is moved in and out of the reactor by cable pulls. The use of a cable pull system requires that there be as little friction as possible between the travel path of the cables and the guide tube and also requires mechanisms functioning at at least two speeds. As a result of these complexities it may be difficult to make rapid determinations of the neutron density distribution.

A variation of the prior system disclosed utilizes a probe comprising a chain of loosely connected spheres which are moved into or from the reactor vessel by compressed gas. Although such a construction overcomes many of the problems associated with rod-shaped, tape-shaped, or wire-shaped probes the possibility can arise that internal irregularities or bends in the guide tube may separate the spheres so that there are no longer contiguous as they enter the reactor core. In this event separation of the first and last spheres in a column arriving in the reactor core can create a sufficient time difference as to make an approximately equal radiation exposure impossible.

Such prior systems are, for example, disclosed in German published patent application Ser. No. 1,294,575.

For the foregoing reasons it has been difficult to achieve accurately known dwell times for the solid probes used in reactor radiation measuring systems of the prior types described.

SUMMARY OF THE INVENTION

The present invention provides a system for measuring the local neutron density distribution in the interior of a nuclear reactor, which is intended to obviate or minimize problems of the type previously described.

In more detail a measuring system according to the present invention is intended for measuring the local neutron density distribution in the interior of a nuclear reactor of the type including a wall defining a reactor vessel and a core or fission zone within the vessel. The measuring system includes a pipe passing through the wall of the reactor vessel and the fission zone. A probe, configured as a helical spring is mounted for motion along the interior of the pipe. A compressed gas drive assembly connected with the pipe causes selective motion of the probe between activation and measurement positions within the guide tube located internally and externally of the reactor vessel, respectively. A measuring device connected with the pipe measures the radioactivity levels of the probe along its length when it occupies the measurement position.

The use of a probe configured as a helical spring and driven by gas pressure along the pipe avoids the problems inherent in the use of the wire cable pulls associated with the previous rod, tape and wire-shaped probes and also avoids the problems of longitudinal separation of the spheres associated with prior probes of the connected-sphere type. As a result the residence time of the probe in the fission zone can be more accurately controlled so that the measured level of radiation provides a more accurate index of the local neutron distribution within the reactor.

BRIEF DESCRIPTION OF THE DRAWINGS

A system for measuring the neutron density distribution in the interior of a nuclear reactor, constructed in accordance with a preferred embodiment of the invention, is illustrated in the accompanying drawings in which.

DETAILED DESCRIPTION

Figure 1:
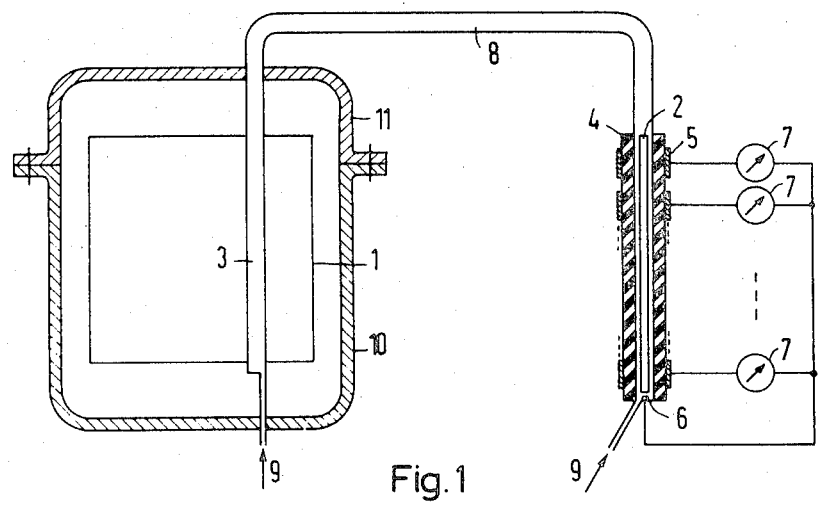
FIG. 1 is a simplified schematic view of the system constructed in accordance with the invention, applied to a nuclear reactor.
Figure 2:
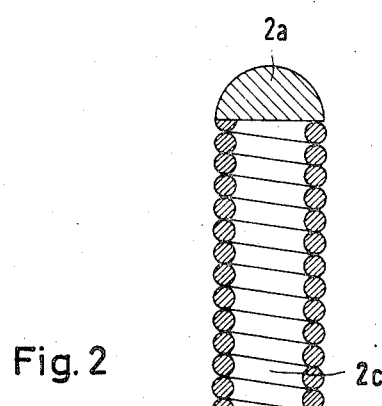
FIG. 2 is a cross-sectional side view on an enlarged scale of a probe forming a part of the system shown in FIG. 1.

Referring to FIG. 1 of the drawings, a system constructed in accordance with the preferred embodiment of the invention is there shown. The system is applied to a nuclear reactor having a central core 1 constituting a fission zone.

The neutron density distribution within the fission zone is measured by causing a movable probe 2 to move between an activation position 3 in the core, in which the probe is subjected to varying levels of radioactivity along its length by the neutrons according to the local flux density, and a measuring tube 4 positioned outside the reactor. Distributed along the length of the measuring tube 4, which is made of insulating material, are a plurality of metal sleeves or sections 5. The number of the sleeves 5 depends upon the length of the probe 2 and the individual dimensions of each sleeve and, for example, as many as ten or more may be provided. The metal sleeves can be made in the form of a metal film vapor deposited on a ceramic tube. An alternative construction provides for a number of metallic tube sections provided with an insulating layer on their interior side with the sections being mounted on a carrier of insulating material.

At the lower end of the measuring tube 4 there is positioned an emitter contact 6 which establishes a conducting connection to the probe 2 when it is in the measuring tube. Associated with each of the sections 5 to measure the electrical current caused by beta radiation emitted from the adjacent portion of the probe, is a measuring device 7. The measuring device may be a direct current amplifier followed by an indicating instrument and the measuring devices are connected via a common base line to the emitter contact 6.

The measuring tube 4 forms one arm of a generally U-shaped guide tube 8 whose other arm, which extends into the reactor and through the fission zone 1, constitutes the previously mentioned activation position 3. The probe 2 is driven along the guide tube 8 from one extremity to the other by compressed air connections 9 provided at opposite ends of the guide tube. The reactor includes a reactor pressure vessel 10 the wall of which includes a lid 11 through which the guide tube 8 passes.

In operation with probe 2 in an initial non-irradiated condition in the measuring portion 4 of the tube, compressed air is admitted through the adjacent connection 9 to force the probe to the activation position 3. In the activation position, the probe 2 is irradiated to different levels along its length by the neutrons according to the local flux density. After a predetermined interval, the now radioactive probe 2 is returned to the measuring position 4 by compressed air supplied to the opposite end of the guide tube 8 through the associated one of the connections 9. In the measuring tube 4, the electric currents caused by the beta radiation from the radioactive probe are measured by the measuring devices 7 which give varying readings depending upon the degree of radioactivity of the associated portion of the probe. The readings of the measuring devices 7 thereby provide an indication which is related to the local neutron density distribution in the interior of the nuclear reactor. The resolution obtained can be varied by increasing or decreasing the number of the electrode sections 5.

A particular feature of the invention is the construction of the probe 2 which constitutes a helical spring made from closely wound turns of steel wire. The flexible nature of the helical conformation enables the probe to follow the twists and bends of the guide tube 8. Unlike a column of spheres however the movable elements of the probe maintain their equal spacing so that uneven residence times in the fission zones which might occur with a column of spheres are avoided. The ends of the probe are closed by steel hemispherical end members 2a and 2b attached by soldering or other conventional securing methods. The end members are acted on by the compressed air to assist in the motion of the probe along the guide tube.

Additionally the interior 2c of the helical spring may be filled with a lubricant so that when the probe slides through the guide tube the lubricant leaks to the outside lubricating its passage. One suitable lubricant is a powder of molybdenum bisulfide which is commercially obtainable under the trade name Molykote.

We claim:

1. Apparatus for measuring the neutron density distribution in the fission zone within a nuclear reactor and including a tube which extends through said zone and to the outside of the reactor to a measuring location and having one or more bends therebetween, a slidably solid probe within said tube, and means for selectively supplying gas under pressure to said tube at locations pneumatically sliding said probe through said tube between said zone and said location; wherein the improvement comprises said probe being a substantially helical spring formed by a coil of wire and having means for receiving the moving force from said gas and which is connected to an end of and enclosing an end of said coil, said coil being flexible to enable it to follow said bend or bends of said tube as the probe slides therethrough.

2. The apparatus of claim 1 in which said coil has closely wound turns of said wire.

3. The apparatus of claim 1 in which said moving force receiving means closes both ends of said coil and the coil has closely wound turns of said wire and is filled internally with a lubricant which leaks to the outside of the coil as the latter slides through said tube.

4. The apparatus of claim 1 in which said means for receiving the moving force from said gas comprises a hemispherical member having a base connected to an end of said coil.

5. The apparatus of claim 4 in which said wire and said member are made of the same material.

6. The apparatus of claim 5 in which said material is steel.

7. The apparatus of claim 4 in which each end of said coil has one of said hemispherical members connected thereto and made of the same material as is said wire, and said coil has closely wound turns of said wire and is filled internally with a lubricant which leaks to the outside of the coil while said probe slides through said tube.

8. The apparatus of claim 7 in which said material is steel.

* * * * *